United States Patent Office 2,717,248
Patented Sept. 6, 1955

2,717,248

POLYMERIZATION OF VINYL CHLORIDE WITH MONOPERMALONATE CATALYST

William E. Vaughan, Berkeley, and Fred E. Condo, El Cerrito, Calif., assignors to Shell Development Company, San Francisco, Calif., a corporation of Delaware No Drawing. Application August 2, 1948, Serial No. 42,153

1 Claim. (Cl. 260—92.8)

This invention relates to a method for polymerizing polymerizable unsaturated organic compounds. More particularly the invention relates to an improved process for the polymerization of vinyl-type compounds and to the improved products produced thereby.

More specifically the invention provides a practical and highly efficient method for the polymerization and copolymerization of vinyl-type compounds which comprises polymerizing the said compounds in the presence of a catalyst consisting of the organic peresters of non-aromatic carboxylic acids described hereinafter, preferably in a mildly alkaline medium. The novel process of the invention is characterized by the fact that it may be carried out at a very fast rate at relatively low reaction temperatures, requires only very small amounts of catalyst to initiate the polymerization, and bring about a very high conversion of monomer to polymer.

The polymers and copolymers produced by the novel polymerization process, at low temperatures and low catalyst concentrations, possess exceptionally high molecular weights and yield resins possessing increased tensile strength and flexibility, and improved color, said resins being superior in this regard to similar resins produced by the known high temperature polymerization methods.

Vinyl-type compounds, such as vinyl chloride, undergo addition polymerization to form potentially valuable polymers. Known methods for the polymerization of these compounds comprise treating the monomeric material in the vapor phase, solvent, solution, or emulsion with an immiscible liquid, with a peroxide catalyst, such as benzoyl peroxide, a per-acid catalyst, such as persulfuric acid, a per-salt catalyst, such as potassium persulfate, or an aromatic perester catalyst, such as tert-butyl perphthalate. These methods posses a disadvantage, however, in that the polymerization proceeds at a very slow rate at the desired low temperatures despite the acceleration given to the reaction by the above-mentioned catalysts. For any type of efficient operation the processes must be conducted at higher temperatures and this is undesirable as the use of the high temperatures results in the production of polymers having low molecular weights, poor color, poor form-stability at room temperatures and inferior mechanical properties.

It is an object of the invention, therefore, to provide a method for the polymerization and copolymerization of vinyl-type compounds which may be conducted at a relatively fast rate at low reaction temperatures. It is a further object of the invention to provide a method for effectively increasing the rate of polymerization and copolymerization of vinyl-type compounds. It is a further object of the invention to provide a method for the production of high molecular weight polymers and copolymers of vinyl-type compounds which possess improved tensile strength, flexibility and color. It is a further object to provide a new class of catalysts for use in the polymerization and copolymerization of vinyl-type compounds. It is a further object to provide a new class of catalysts which may be used to produce improved polymers and copolymers of vinyl-type compounds in much higher yields in a much shorter period of time than it has been possible heretofore. Other objects of the invention will be apparent from the detailed description given hereinafter.

It has now been discovered that these and other objects of the invention may be accomplished by the novel process of the invention which comprises polymerizing the vinyl-type compounds in the presence of a catalyst consisting of an organic perester of a non-aromatic carboxylic acid described hereinafter, preferably in a mildly alkaline medium. It has been found that by the use of only very small amounts of this special group of catalysts the polymerization and copolymerization of the vinyl-type compounds may be accomplished at surprisingly fast rates even at temperatures at or near room temperature. It has been found, for example, that by use of the novel method of the invention the polymerization of the vinyl-type, such as vinyl chloride, which heretofore had required from 24 hours to 72 hours to complete at temperatures from 80° C. to 100° C. can now be completed in the surprisingly short time of about 15 minutes at room temperature using only about one tenth the usual amount of catalyst. In addition, it has been discovered that the polymers and copolymers produced by the novel process possess very high molecular weights and may be used to produce resins having improved tensile strength, flexibility and color over the prior known vinyl-type resins.

The process of the invention may be used to accomplish the polymerization and copolymerization of any of the vinyl-type compounds. The term "vinyl-type" as used throughout the specification and appended claims is meant to include those polymerizable unsaturated organic compounds containing in their molecule at least one terminal methylene group attached to a carbon atom by an ethylene double bond, i. e. compounds containing at least one $CH_2=C<$ group. Included within this group of compounds are the butadienes, such as butadiene-1,3, 2,3-dimethylbutadiene-1,3, piperylene, isoprene, chloroprene, the aromatic compounds, such as styrene, alpha-methyl styrene, dichlorostyrene, vinyl naphthalene, vinyl phenol, and the like. Other examples of the vinyl-type compounds are the unsaturated acids, such as acrylic acid and the alpha-alkyl substituted acrylic acids; the esters of these unsaturated acids, such as methyl acrylate, methyl methacrylate, butyl methacrylate, and propyl acrylate; the vinylidene halide, such as vinylidene chloride and vinylidene bromide; the vinyl esters of inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; and the vinyl ketones, such as vinyl butyl ketone, and vinyl ethyl ketone. This group also includes the allyl derivatives, such as the allyl esters of the monocarboxylic acids, as allyl acetate and allyl butyrate; the allyl esters of the polycarboxylic acids such as diallyl phthalate, diallyl adipate, and diallyl succinate; the allyl esters of the inorganic acids, such as allyl chloride, methallyl chloride, etc.; the allyl esters of the unsaturated acids, such as allyl acrylate, allyl crotonate, and methallyl methacrylate; and the allyl ketones, allyl ethers, and the like.

A particularly preferred group of vinyl-type compounds to be polymerized by the process of the invention are the members of the group consisting of the vinylidene halides, acrylic acid and alpha-alkyl substituted acrylic acids, the alkyl esters of acrylic acid and alpha-alkyl substituted acrylic acids, the vinyl esters of the acrylic acid and alpha-alkyl substituted acrylic acids, the vinyl esters of the halogen and hydrocyanic acid, styrene and the alkyl-substituted styrenes. Examples of this preferred group of vinyl-type compounds are vinylidene chloride, vinylidene bromide, acrylonitrile, methacrylonitrile, ethacrylonitrile, methyl acrylate, methyl methacrylate, butyl acrylate, vinyl acrylate, vinyl methacrylate, styrene, alpha-methyl styrene, 4-methyl styrene, and 4-butyl styrene.

The invention is also applicable to the copolymerization of the above-described vinyl-type compounds with other type polymerizable unsaturated organic compounds, preferably those containing at least one ethylenic linkage $>C=C<$. Examples of such compounds comprise the carbonic acid ester of the unsaturated diols such as butadiene-3,4 carbonate, the saturated esters of the unsaturated acids, such as diethyl fumarate, diethylmaleate, crotonic esters, and the like. When these materials are used to produce copolymers with the vinyl type compounds by the process of the invention it is preferred to utilize them in minor quantities e. g. from .1% to 30% by weight of vinyl-type compound with which they are to be copolymerized.

The catalysts to be employed in the process of the invention comprise the organic peresters of non-aromatic carboxylic acids which contain at least one carbonyl group

within the acid molecule not more than four carbon atoms and preferably not more than two carbon atoms removed from the perester group. While the relationship between the carbonyl group and the perester group is not definitely understood it has been found that their combined presence in the ester molecule yields compounds having a surprisingly high activity toward the polymerization and copolymerization of the vinyl-type compounds.

Preferred compounds to be utilized as catalysts in the process of the invention are the members of the group consisting of (1) the tert-alkyl peresters of the non-aromatic keto-substituted permonocarboxylic acids wherein at least one carbonyl group is contained in the acid portion of the molecule not more than four carbon atoms removed from the perester group, (2) the tert-alkyl monoperesters of the non-aromatic monoperdicarboxylic acids wherein the free carboxyl group is not more than four carbon atoms removed from the perester group, (3) the O,O-tert-alkyl O-alkyl esters of the non-aromatic dicarboxylic acids wherein the ester groups are not more than four carbon atoms removed from each other, (4) the tert-alkyl diperesters of the non-aromatic diperdicarboxylic acids wherein the two perester groups are not more than four carbon atoms removed from each other, (5) the tert-alkyl alkyl diperester of the non-aromatic diperdicarboxylic acids wherein the two perester groups are not more than four carbon atoms removed from each other. The notations, O,O- and O- used above refer in the usual manner to the percarboxyl radical and the carboxyl radical respectively. Thus, O,O-tert-butyl O-ethyl monopermalonate has the formula:

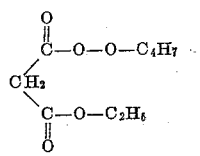

These preferred groups of compounds comprise the esters of the required keto-containing peracid and the required monohydric alcohol. The peracids which may be theoretically used to prepare the peresters listed under group (1) above may be exemplified by beta-keto perpropionic acid, beta-keto gamma-chloro pervaleric acid, gamma-keto perbutyric acid, delta-keto percaproic acid, beta-keto gamma methyl pervaleric acid, beta-keto delta-ethyl percaprylic acid, 3-keto percyclohexanoic acid and the like.

The peracids which may be theoretically used to prepare the esters listed under groups (2) and (3) above may be exemplified by monoperoxalic acid, monopermalonic acid, monopermethylmalonic acid, monoperchlorosuccinic acid, monoperglutaric acid, monoperethyladipic acid, and monoperdicarboxy-cyclohexane,1,3.

The peracids which made up the acid part of the esters listed under groups (4) and (5) above may be exemplified by diperoxalic acid, dipermalonic acid, dipermethylmalonic acid, diperchlorosuccinic acid, diperethylglutaric acid, diperethyladipic acid, diperdicarboxy-cyclohexane,1,3.

The tertiary monohydric alcohol which may be used theoretically to esterify the one essential percarboxylic group of the esters of group 1 to 5 may be exemplified by tert-butyl alcohol, tert-amyl alcohol, tert-hexyl alcohol, tert-heptyl alcohol and the like.

The monohydric alcohols which may be used theoretically to esterify the other percarboxyl groups of carboxyl groups of the esters of groups 3 and 5 may be exemplified by methyl alcohol, ethyl alcohol, tert-butyl alcohol, isopropyl alcohol, hexyl alcohol, isoamyl alcohol, octyl alcohol, heptyl alcohol and the like.

The first group of the above-described peresters may be exemplified by tert-butyl beta-keto perpropionate, tert-amyl gamma-keto perbutyrate, tert-pentyl delta-keto pervalerate, tert-butyl beta-keto pervalerate, tert-amyl beta-keto,gamma-ethyl percaproate, and tert-hexyl gamma-keto percaproate.

The second group of the above-described peresters may be exemplified by tert-butyl monoperoxalate, tert-hexyl monopermalonate, tert-hexyl monopermethylmalonate, tert-amyl monopersuccinate, tert-hexyl monoperglutarate, and tert-amyl monoperadipate.

The third group of the above-described peresters may be exemplified by O,O-tert-butyl O-methyl monoperoxalate, O,O-tert-amyl O-butyl monopermalonate, O,O-tert-butyl O-pentyl monoperglutarate, O,O-tert-butyl O-isopropyl monoperadipate, O,O-tert-butyl O-pentyl monopermethylsuccinate, O,O-tert-hexyl O-hexyl monoperethylglutarate, and O,O-tert-amyl O-butyl monoperadipate.

The fourth group of the above-described peresters may be exemplified by tert-butyl diperoxalate, tert-amyl dipermalonate, tert-hexyl dipermethylmalonate, tert-hexyl diperglutarate, tert-amyl dipersuccinate, and tert-butyl dipermethyladipate.

The fifth group of the above-described peresters may be exemplified by tert-butyl methyl diperoxalate, tert-butyl butyl dipermalonate, di-tert-butyl diperoxalate, di-tert-amyl dipermethylmalonate, di-tert-hexyl dipersuccinate, di-tert-amyl diperglutarate, di-tert-butyl dipermethyladipate, and tert-amyl hexyl diperadipate.

A particularly preferred group of the organic peresters of the non-aromatic carboxylic acids to be used in the process of the invention are members of the group consisting of (1) the tert-alkyl peresters of the non-aromatic keto-substituted permonocarboxylic acids wherein at least one carbonyl group is contained in the acid portion of the molecule not more than four carbon atoms removed from the perester group, (2) the O,O-tert-alkyl O-alkyl esters of the non-aromatic dicarboxylic acids wherein the ester groups are not more than four carbon atoms removed from each other, and (3) the tert-alkyl alkyl diperesters of the non-aromatic diperdicarboxylic acids wherein the two perester groups are not more than four carbon atoms removed from each other. The alkyl groups in the alcohol portion of the above-described ester molecules perferably contain from 4 to 6 carbon atoms, such as tert-butyl, tert-hexyl, and tert-amyl, methyl, ethyl, butyl, isobutyl, amyl and isoamyl radicals. The acid portion of the above-described ester molecules preferably contain from 2 to 6 carbon atoms, such as derived from oxalic, malonic, methylmalonic, succinic, glutaric, and ethyl succinic acids.

The particularly preferred group of peresters to be used as catalysts in the process of the invention may be exemplified by:

O,O-tert-butyl O-ethyl monopermalonate
Di-tert-butyl dipermalonate
Di-tert-butyl diperoxalate
Di-tert-butyl monopermalonate
Di-tert-amyl dipersuccinate
O,O-tert-butyl O-ethyl monopermalonate
O,O-tert-hexyl O-ethyl monopersuccinate
Di-tert-butyl dipermethylmalonate
Di-tert-amyl dipermethylmalonate
Di-tert-hexyl diperethylsuccinate
Di-tert-hexyl diperglutarate
Di-tert-amyl dipersuccinate The above-described organic peresters of the non-aromatic carboxylic acids may be produced by any suitable method. The more preferred method of preparation comprises reacting a hydroperoxide compound with the desired acyl halide in the presence of an alkali such as pyridine, sodium or potassium bicarbonate or sodium hydroxide. This method of preparation may be illustrated by the following equation showing the preparation of di-tert-butyl dipermalonate:

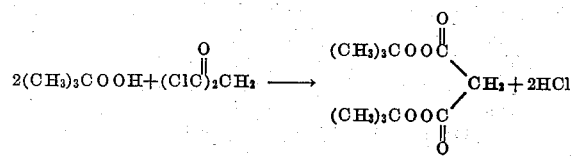

A more detailed description of this method of preparation may be found in a co-pending application of Frank H. Dickey, Serial No. 715,132, filed December 9, 1946.

Polymerization of the vinyl-type compounds in the presence of the above-described organic peresters of the non-aromatic carboxylic acids may be accomplished under a variety of conditions. The polymerization may be carried out, for example, in any type of medium and under the application of any type of external energy, such as heat, light, etc. Such suitable methods include the polymerization of the vinyl-type compounds in bulk, in a solvent solution, or in an emulsion in the presence or absence of emulsifying agents. If the polymerization is to be conducted in a solvent solution, the solvent selected may be a solvent for the monomer and a nonsolvent for the resulting polymer or it may be a solvent for both the monomer and the polymer.

A single organic perester of non-armoatic carboxylic acids described above may be used as the catalyst for the polymerization process or a mixture of two or more of the peresters may be utilized. The amount of the perester or mixture thereof to be used in the polymerization process will vary with the type of polymerization employed, the compounds to be polymerized or copolymerized, etc. In some cases amounts of catalyst as low as 0.01% will be sufficient to bring about the desired polymerization. Other cases may require as high or higher than about 0.5% catalyst. Preferred amounts of catalyst to be used in the polymerization process will vary between 0.01% to 0.25%.

The polymerization may be conducted in an acid, neutral or basic medium. It is usually preferred, however, to accomplish the polymerization in a mildly alkaline medium as the above-described organic peresters usually display their maximum catalytic activity under these conditions.

The temperature to be employed in the polymerization process may vary over a considerable range. The advantages of the novel process of the invention are more prominent, however, when the relatively low temperatures are employed. The use of temperatures as low or lower than $-10°$ C. give very satisfactory rates of polymerization and produce polymers and copolymers possessing the desired properties. The use of temperatures much above $50°$ C. should be avoided as they tend to cause decomposition of the perester catalysts. Preferred temperatures range from $0°$ C. to $40°$ C. Atmospheric, superatmospheric or subatmospheric pressures may be used during the polymerization.

Because the above-described organic peresters usually display their highest catalytic activity in mildly alkaline mediums it is usually preferred to accomplish the polymerization in an aqueous emulsion where the desired degree of alkalinity can easily be maintained. In this preferred method the material to be polymerized is added to a mixture containing water, an emulsifying agent, a mildly alkaline pH adjuster, and the organic perester catalyst, and the resulting mixture maintained at the desired temperature and pressure.

Emulsifying agents that may be employed in the preferred polymerization procedure includes the soaps, such as sodium and potassium myristate, laurate, palmitate, oleate, stearate, rosinate and hydroabietate; the alkali metal alkyl or alkylene sulfates, such as sodium lauryl sulfate, potassium stearyl sulfate; the alkali metal alkyl or alkylene sulfonates, such as sodium lauryl sulfonate, potassium stearyl sulfonate, and sodium cetyl sulfonate; sulfonated mineral oil, as well as the ammonium salts thereof; and salts of higher amines like lauryl amine hydrochloride, and stearyl amine hydrobromide.

The amount of the emulsifying agent to be employed in the polymerization mixture will vary over a considerable range depending upon the particular material being polymerized, the amount of water present in the mixture, and the kind and amount of other ingredients added thereto. In general, the amount will vary from about 0.1% to about 6% by weight of monomer. The preferred amount of the emulsifying agent to be employed will vary between about 0.1% to 1% by weight of monomer.

The emulsion may be maintained in the preferred mildly alkaline condition by the addition of alkaline pH adjusters, such as trisodium phosphate, sodium carbonate, sodium bicarbonate, tetrasodium pyrophosphate, disodium hydrogen phosphate and calcium carbonate. Sodium bicarbonate is usually the preferred agent to be used for this purpose.

The vinyl-type compounds to be added to the aqueous emulsion containing the emulsifying agent and the perester catalyst may comprise just a single compound, a mixture of two or more vinyl-type compounds or a mixture of vinyl-type compounds with other polymerizable organic compounds, described hereinabove, in the desired proportions. The compounds may be added in the monomeric form or in a partially polymerized form, but the monomeric form is preferred.

The amount of the vinyl-type compounds or mixtures thereof to be added to the aqueous emulsion may vary over a considerable range. In most cases it is desirable to maintain the ratio of the vinyl-type compound to water smaller than 1 to 2. When the ratio is larger than 1 to 2, the emulsion usually becomes too thick to be handled efficiently and the results are not as satisfactory as desired. The preferred ratio of the vinyl-type compounds or mixtures thereof to water to be maintained in the emulsion mixture varies between 1 to 3 and about 1 to 5.

Various other ingredients may be added to the aqueous emulsion before or during the polymerization process. These ingredients include emulsion stabilizers such as polysaccharides, gum arabic, soluble starch, dextrine, and plasticizers, lubricants, dyes, pigments and fillers. Plasticizers for the resin, such as dioctyl phthalate may also be added. The nature and amount of the modifiers and stabilizers will depend upon the particular vinyl-type material being polymerized and upon the intended use of the final product.

Temperatures to be employed in the preferred aqueous emulsion polymerization process will preferably vary between 0° C. to 40° C. although they sometimes may go as low as −10° C. The polymerization may be conducted under atmospheric, superatmospheric or subatmospheric pressures.

It is desirable in most cases to accomplish the polymerization in the absence of oxygen. In many cases it is preferred to conduct the polymerization in the atmosphere of the monomer being polymerized.

The preferred polymerization process may be accomplished in a batchwise or continuous manner. If the process is to be conducted in a continuous manner, the preferred method is to regulate the process so that the aqueous emulsion is conducted through a series of distinct reaction zones like separate connected reaction chambers as disclosed in a copending application of Willem De Nie, Serial No. 681,681, filed July 6, 1946.

The product formed during the polymerization process will in most cases be obtained in the form of a latex and may readily be recovered by any suitable means, such as coagulation with electrolytes, solvents, freezing, dehydration, and the like.

The polymers or copolymers obtained will be substantially colorless products possessing a relatively high molecular weight. Plasticized compositions produced from the polymers possess excellent color and improved flexibility and tensile strength. In the molten or solvent form they may readily be cast into sheets, rods, tubes, and the like of any desired shapes or sizes. They may also be subjected to extrusion and to injection and compression molding in the presence or absence of added diluents and plasticizers. They may also be utilized in the molten or solution form in the production of surface coatings and impregnating agents.

To illustrate the manner in which the invention may be carried out the following examples are given. It is to be understood, however, that the examples are for the purpose of illustration and the invention is not to be regarded as limited to any of the specific conditions cited therein.

*Example I*

(a) About 100 parts of monomeric vinyl chloride were added to a mixture containing about 400 parts of water, 5 parts of sodium lauryl sulfate and 1 part of hydrogen peroxide. The mixture was heated to 50° C. In about 24 hours an 85% yield of polyvinyl chloride was obtained. 100 parts of the polymer were mixed with 50 parts of dioctyl phthalate, 2 parts of glycerol monooleate and the resulting mixture milled 5 minutes at 140° C. and pressed 2 minutes at 160° C. The flexible specimen thus produced possessed the following physical properties:

| Color | Tensile Strength, p. s. i. | 100% Modulus, p. s. i. | Ultimate Elongation, Percent |
|---|---|---|---|
| Severe Haze | 1,990 | 1,540 | 135 |

(b) About 100 parts of monomeric vinyl chloride were added to a mixture comprising about 210 parts of water, 2 parts of sodium lauryl sulfate and 4 parts of benzoyl peroxide. The mixture was heated to 40° C. In about 77 hours an 81% yield of polyvinyl chloride was obtained.

(c) About 100 parts of monomeric vinyl chloride were added to a mixture containing about 300 parts of water, 2 parts of sodium lauryl sulfate and 2 parts of diacetyl peroxide. The mixture was heated to 50° C. In about 56 hours a 78% yield of polyvinyl chloride was obtained.

(d) About 100 parts of vinyl chloride were added to a mixture containing about 300 parts of water, 2 parts of sodium lauryl sulfate and 2 parts of tert-butyl perbenzoate. The resulting mixture was maintained at 50° C. for about 46 hours. At the completion of the heating there was obtained a yield of only 27% polymer.

(e) About 100 parts of vinyl chloride were added to a mixture containing about 400 parts of water, 1 part of sodium lauryl sulfate, and 0.5 parts trisodium phosphate, and 0.25 parts of di-tert-butyl dipermalonate. The mixture was maintained at 20° C. In less than 15 minutes a yield of 95% was obtained. A flexible specimen produced from the resulting polymer by the method indicated in (a) above possessed the following physical properties:

| Color | Tensile Strength, p. s. i. | 100% Modulus, p. s. i. | Ultimate Elongation, Percent |
|---|---|---|---|
| Clear | 2,340 | 1,820 | 205 |

A comparison of the physical properties of this specimen with that produced in (a) above indicates the high quality of polymer obtained by the use of the process of the invention. The production of such high quality polymers in such a short reaction period was indeed surprising for it had been previously found that such rapid polymerization by other methods produced polymers of very low quality.

*Example II*

About 100 parts of vinyl chloride were added to a mixture containing about 400 parts of water, 0.5 part of sodium lauryl sulfate, 0.5 part of sodium bicarbonate, and 0.1 part of O,O-tert-butyl O-ethyl monopermalonate. The resulting mixture was maintained at 40° C. In less than 35 minutes a 90% yield of polymer was obtained. A molded plasticized sheet produced from the resulting polymer according to the procedure outlined in Example I (a) possessed the following physical properties: Tensile strength, 2510 p. s. i.; ultimate elongation, 260%; and a clear color.

*Example III*

About 100 parts of vinyl chloride were added to a mixture containing about 400 parts of water, 0.5 part of sodium lauryl sulfate, 0.5 part of trisodium phosphate, and 0.5 part of O,O-tert-butyl O-ethyl monopermalonate. The mixture was maintained at 40° C. In 15 minutes a 97.5% conversion to polymer of high quality was obtained.

*Example IV*

About 100 part samples of methyl methacrylate and styrene were placed in sealed tubes with 1 part of catalyst described below. One set of tubes was placed in a room maintained at 25° C. and another set was placed in a room maintained at 43° C. The time taken for each sample to attain sufficient polymer concentration to become non-flowing is indicated below:

| Monomer | Catalyst | Setting up Time (Hrs.) | |
|---|---|---|---|
| | | 25° C. | 43° C. |
| Methyl methacrylate | Benzoyl peroxide | 24 | 8 |
| | tert-butyl perbenzoate | 168 | 29 |
| | Di-tert-butyl dipermalonate | 5 | 3 |
| Styrene | Benzoyl peroxide | 730 | 165 |
| | tert-butyl perbenzoate | 1,850 | 315 |
| | Di-tert-butyl dipermalonate | 48 | 21 |

*Example V*

Methyl methacrylate, methacrylonitrile and styrene were polymerized in separate mildly alkaline aqueous emulsions in the presence of the perester catalysts indicated below. The polymerization mixture in each case was made up of 100 parts monomer, 0.5 part catalyst, 1 part sodium lauryl sulfate, 0.5 part sodium bicarbonate and 300 parts water. The polymerization was conducted at 43° C. The results obtained in each case are indicated in the table below:

| Monomer | Catalyst | Polymerization time (hrs.) | Percent polymerized |
|---|---|---|---|
| Methyl methacrylate | Benzoyl peroxide | .5 | 1 |
|  | tert-butyl perbenzoate | .5 | 0 |
|  | Di-tert-butyl dipermalonate | .3 | 94 |
| Methacrylonitrile | Benzoyl peroxide | 6.5 | 2 |
|  | tert-butyl perbenzoate | 6.5 | 0 |
|  | Di-tert-butyl dipermalonate | 6.5 | 23 |
| Styrene | Benzoyl peroxide | 1.0 | 1 |
|  | tert-butyl perbenzoate | 1.0 | 0 |
|  | Di-tert-butyl dipermalonate | 1.0 | 93 |

A comparison of the polymerization periods of these runs with those shown in Example IV clearly indicates the advantage of utilizing the novel perester catalysts in a mildly alkaline medium.

*Example VI*

About 0.1% di-tert-butyl diperoxalate was added to a sample of methyl methacrylate and the resulting mixture was maintained at room temperature. The mixture began to solidify in about 20 minutes.

*Example VII*

Samples of the following monomeric compounds are polymerized in the presence of 0.25 part of di-tert-butyl dipermethylmalonate: allyl vinyl phthalate, vinylidene chloride, a mixture of 40 parts vinyl chloride and 60 parts vinyl acetate, a mixture of 30 parts vinyl chloride and 70 parts vinylidene chloride, diallyl pimelate, alpha-methyl styrene, and divinyl adipate. In each case the polymerization proceeds at a very rapid rate.

*Example VIII*

About 100 parts of vinyl chloride were added to a mixture containing about 400 parts of water, 0.5 part of sodium lauryl sulfate, 0.5 part of sodium bicarbonate, and 0.25 part of tert-butyl beta-keto perbutyrate. The mixture was maintained at a temperature of 40° C. Polymer was formed in the emulsion within five minutes. Plasticized specimens from the resulting polymer according to the procedure outlined in Example I (*a*) possessed the following physical properties: Tensile strength, 2470 p. s. i.; ultimate elongation, 310%; and a clear color.

We claim as our invention:

A process comprising polymerizing vinyl chloride in a mildly alkaline aqueous emulsion in the presence of 0.01% to 0.5% by weight of O,O-tertiary-butyl O-ethyl monopermalonate having the structure:

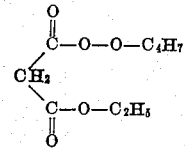

at a temperature between —10° C. and +50° C.

References Cited in the file of this patent
UNITED STATES PATENTS

| | | |
|---|---|---|
| 1,980,483 | Hill | Nov. 13, 1934 |
| 2,319,576 | Agens | May 18, 1943 |
| 2,370,588 | Strain | Feb. 27, 1945 |
| 2,420,911 | Roedel | May 20, 1947 |
| 2,524,536 | Nordlander et al. | Oct. 3, 1950 |
| 2,543,635 | Loritsch | Feb. 27, 1951 |

OTHER REFERENCES

Milas et al.: Article in Journal Am. Chem. Soc. vol. 68. Pages 642–643, April 1946.